Figure 1:
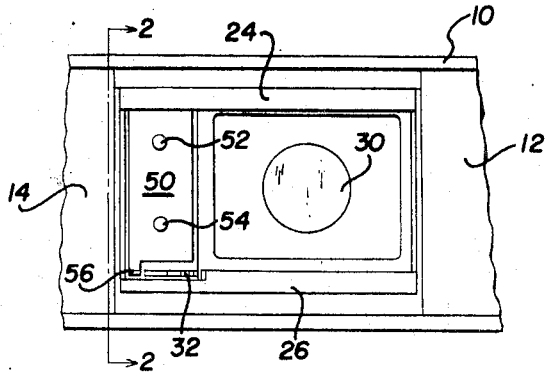
Figure 2:
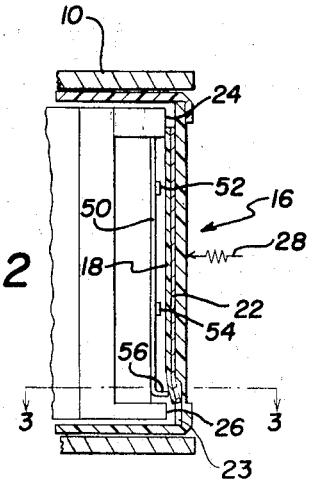
Figure 3:
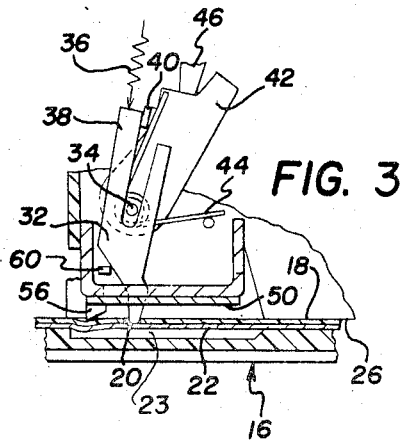
Figure 4:
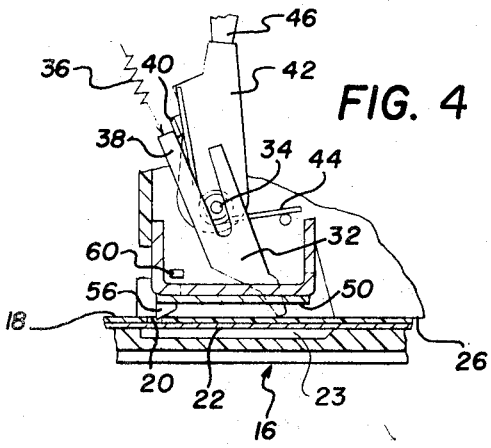
Figure 5:
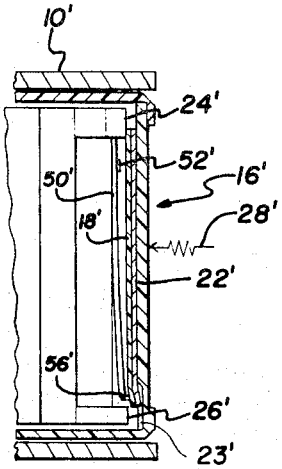

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 5, 1974

920 O.G. 9

T920,011
FILM MOVEMENT PREVENTING MEANS
James E. Dierks, Rochester, N.Y.
Continuation of abandoned application Ser. No. 316,639, Dec. 19, 1972, which is a continuation of application Ser. No. 217,808, Jan. 14, 1972. This application June 28, 1973, Ser. No. 374,726
Int. Cl. G03b *19/04*
U.S. Cl. 95—31 FM
1 Sheet Drawing. 7 Pages Specification

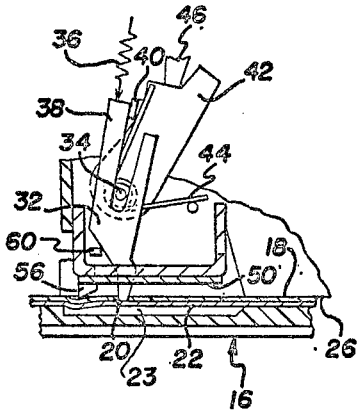

A camera receives perforated roll film in a cartridge having a surface across which the film is advanced and a recess in the surface in general alignment with the film perforations. The camera includes a film advance mechanism and means for selectably disabling the film advance mechanism. A film perforation sensing pawl rests against the film surface to fall into a perforation of the advancing film and to be moved thereby against the force of a spring until the sensing pawl reaches a predetermined position whereat the disabling means is activated to disable the film advance mechanism. The side load on the film from the spring force on the sensing pawl tends to push the film backward along the exposure plane, thereby tending to cause undesired film movement during an exposure. A member or dart fixed in the camera projects across the camera's exposure plane in the region of the recess of a received cartridge for depressing the film into the recess to prevent such undesired film movement. The relationship of the dart and the recess permits film advancement in one direction but prevents film movement in the opposed direction.

FILM MOVEMENT PREVENTING MEANS

Original Filed Jan. 14, 1972